G. M. KLINELINE.
AUTOMOBILE RIM.
APPLICATION FILED MAY 7, 1920.
1,381,565.
Patented June 14, 1921.
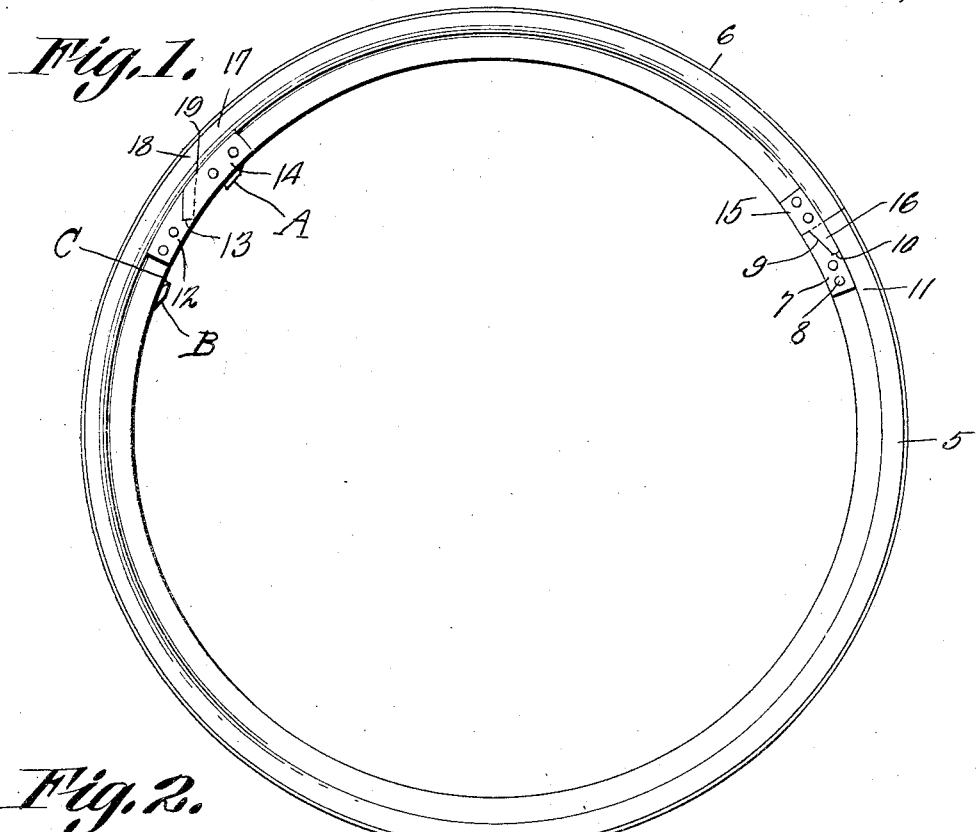
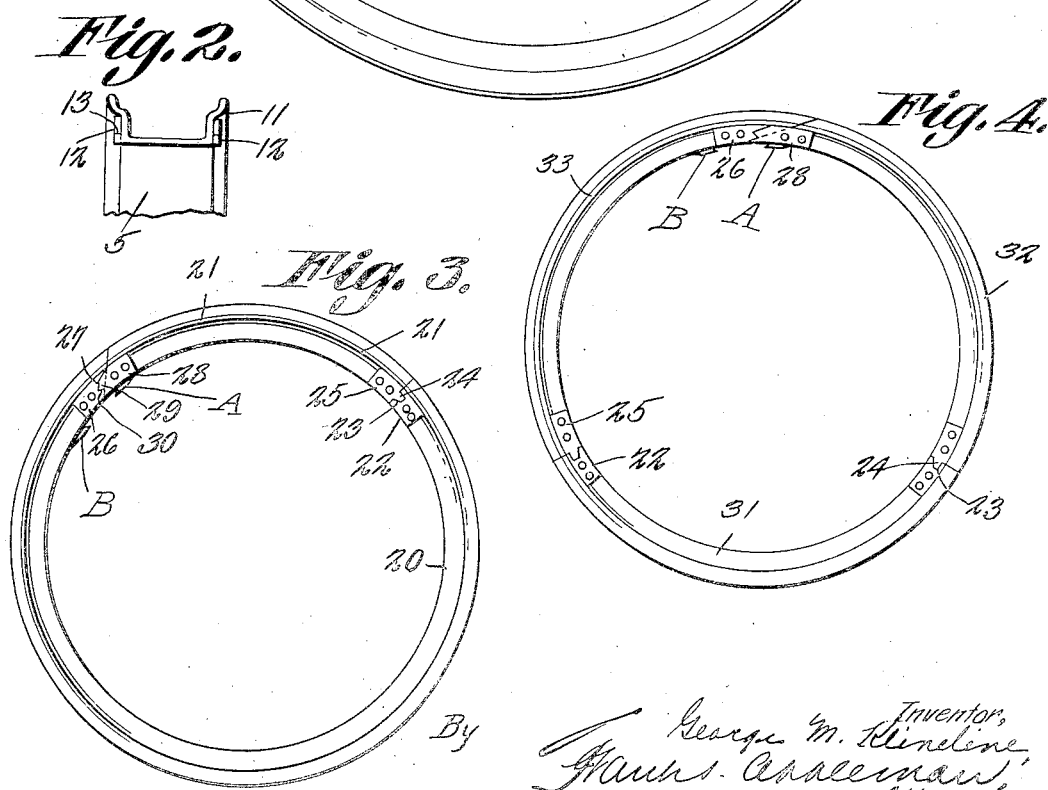

UNITED STATES PATENT OFFICE.

GEORGE M. KLINELINE, OF HARRISBURG, PENNSYLVANIA.

AUTOMOBILE-RIM.

1,381,565.  Specification of Letters Patent.  Patented June 14, 1921.

Application filed May 7, 1920. Serial No. 379,589.

*To all whom it may concern:*

Be it known that I, GEORGE M. KLINELINE, a citizen of the United States of America, and resident of Harrisburg, in the county of Dauphin and State of Pennsylvania, have invented certain new and useful Improvements in Automobile-Rims, of which the following is a specification.

This invention relates to rims for automobile wheels and particularly to those rims which are demountable or detachable from the wheel, the said invention having for its object the provision of novel means whereby the rim may be so adjusted as to permit the ready removal of a tire and whereby the rim may be expanded after the tire has been applied to it for restoring the tire and rim into assembled relation.

A still further object of this invention is to produce a sectional demountable rim having interlocking members which coact to hold the segments or sections of the rim in proper position with relation to one another and with relation to the tire.

A still further object of this invention is to produce interlocking members which may be removed from a rim should they become broken or in any way impaired, so that should these interlocking members lose their efficiency, they can be replaced without losing the remainder of the rim, hence by this invention, the durability of the rim is increased and its efficiency is improved.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a rim embodying the invention;

Fig. 2 illustrates an end view of one of the sections;

Fig. 3 illustrates a slight modification of the form shown in Fig. 1, and

Fig. 4 illustrates a modification in which the sections of the rim of the ring are increased in number.

In these drawings 5 denotes a portion of a demountable rim, the cross section of which may be of any desired construction or form, and I, therefore, do not wish to be limited with respect to this feature. 6 denotes the companion section, which with the section 5, forms the rim or ring to which a tire is to be applied.

As a means for holding the sections 5 and 6 in operative relation to each other, one of the sections has a plate 7 on its side at the end, the said plate being secured to the rim by fastenings 8 such as rivets. It is to be understood that the fastening devices to be described are duplicated on each side of the rim and that, therefore, a description of the fastenings on one side can be understood as being present on the other side. The plate 7 has a cutaway portion 9 at its inner edge forming a shoulder 10, and by reason of the fact that this portion is cut away, a seat is formed between the plate and the flange 11 of the rim. The opposite end of the member 5 in the present embodiment of the invention is supplied with a plate 12 which is secured to the rim, and the end of the plate 12 has a recess 13, the walls of which are at angles to each other to form a seat for the end of the plate 14 which is secured to the side of the member 6 at its end, which is in contact with the end of the section 5. The section 6 is further provided with a plate 15 at its opposite end secured to the, side which plate has a lug 16 applied to the recess formed between the plate 7 and the flange 11 of the section 5, and when the parts are being assembled, this lug 16, one on each side, is first applied, owing to the fact that it is relatively long and forms an efficient anchorage. After these parts are assembled as stated, the section 5 may be sprung or moved with relation to the section 6 by any suitable tire tool so that the end of the plate 14 passes the end of the plate 12 after which the parts are permitted to spring into place so that the end of the plate 14 is seated in the recess of the plate 12.

The end 17 of the section 6 is preferably beveled to conform to the configuration of the angle 18 of the section 5, the angle being indicated at 19 although this angle may be modified or changed to suit particular requirements. In that form of the invention shown in Fig. 3, the construction of the members 20 and 21 may conform to the form of the members 5 and 6 with such modifications and changes as the user or manufacturer desires, and in this modification, the fastening devices are somewhat different. In this form, the plate 22 is fastened to the member 20 as in the preferred form, and the said plate 22 has a recess 23 in its end which receives the lug 24 on the plate 25. In this form, there is no recess between the flange and the plate as in the other form, but the parts are assembled by inserting the lug 24 in the said recess of the plate 22. The opposite end of the section 20 has a plate 26 with a recess 27 in its end, the configuration of the end of the plate 26 being slightly different from that shown in Fig. 1, and this arrangement is provided on account of the fact that the end of the plate 26 is beveled to form a camming surface which will perhaps aid in the movement of the parts with relation to each other when the sections are being moved to bring the ends of the plates into interlocked engagement, it being seen that the plate 28 has a stepped beveled surface forming the projection 29 which fits into the recess of the plate 26, whereas the plate 26 may be said to have a projection or lug 30 which fits in a corresponding depression in the plate 28.

In the form shown in Fig. 4, the rim is made up of a series of sections 31, 32 and 33 practically equal in size, and as shown, the sections have interlocking members similar to those described in connection with the disclosure in that form of the invention shown in Fig. 3, and further detailed description of these fastening devices is believed to be unnecessary.

The rim may have lugs A and B, one opposite the other, and the end of each lug may be undercut as at C so that a tire tool may be employed for spreading the rim sections in seating the fastenings.

I claim:

1. An automobile rim comprising two sections, the contiguous ends at one joint being beveled and the opposite ends being radial, plates secured to the sides of the section at one end, plates secured to the sides of the section at the end contiguous thereto, the said plates having interlocking engagement with each other, the opposite contiguous ends of the sections being beveled, interlocking plates at the said contiguous ends for holding the sections in operative relation to each other.

2. In a rim for automobile wheels, a plurality of sections, plates on the sides of the sections at the ends thereof, and means for causing interlocking engagement of the contiguous plates of the said sections.

3. In a rim for automobile wheels, a plurality of sections, plates on the sides of the sections at the ends thereof, lugs on the sections of the rim, one on each side of a joint, the said lugs having undercut ends to form seats for the engagement of a tire tool, and means for causing interlocking engagement of the contiguous plates of the said sections.

GEORGE M. KLINELINE.